Figure 1:
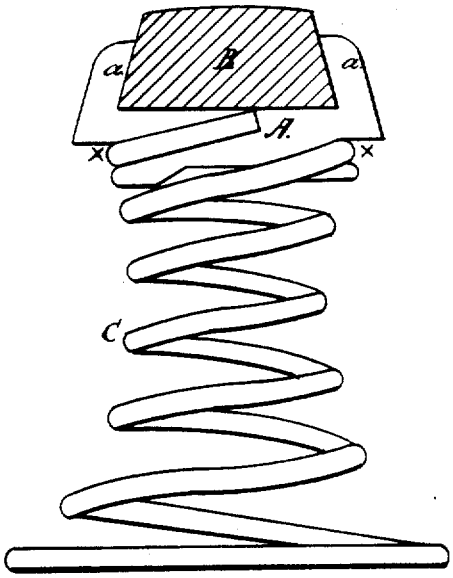
Figure 2:
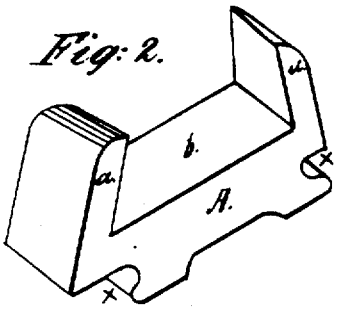

A. S. Babbit.

Original 61595

Spring Bed Bottom,

No. 2,736, Reissued Aug. 20. 1867.

Inventor.

A S Babbit per Alexander H Mason

Atty

Witnesses.

T D Stockbridge

A. A. Geatman

N. PETERS, PHOTO-LITHOGRAPHER, WASHINGTON, D. C.

UNITED STATES PATENT OFFICE.

A. S. BABBIT, OF KEESEVILLE, NEW YORK.

IMPROVED BED-BOTTOM.

Specification forming part of Letters Patent No. 61,595, dated January 29, 1867; Reissue No. 2,736, dated August 20, 1867.

*To all whom it may concern:*

Be it known that I, A. S. BABBIT, of Keeseville, in the county of Essex and State of New York, have invented certain new and useful Improvements in Spring Bed-Bottoms; and I do hereby declare that the following is a full, clear, and exact description thereof, reference being had to the accompanying drawing, and to the letters of reference marked thereon, making a part of this specification.

My invention consists in a neat and economical device for connecting the springs to the slats of the bed-bottom.

In the annexed drawing, A represents a block, which is provided with two ears or lips, *a a*, the tops of which lean toward each other, as shown, thereby forming a bed for the slats B, which said slats are beveled at the sides to fit neatly between the ears. Beneath this bed, upon which the slat is laid, there are formed two shoulders, *x x*, around which the spring C is wound. In using this invention I prefer the ordinary spiral spring, which is connected at its top to the shoulders *x x*, and can be easily connected to the block or extracted therefrom by winding or unwinding the same. The block A can be made of metal, wood, porcelain, or of any other suitable material, and can be used either for connecting the top of the spring C to the slat B, or connecting the base or bottom of the said spring to the cross-slats of the bed. By forming suitable openings in the bottom or cross-slats of the bed and inserting therein the ears *a a*, the block A is thus reversed, leaving its shoulders *x x* upward for securing the bottom of the spring. It will be seen that the slats B cannot be placed down between the ears, but must be passed in between, and when so placed are not liable to become loose or rattle.

Having thus fully described my invention, what I claim as new, and desire to secure by Letters Patent, is—

The block A, with its ears *a a* and shoulders *x x*, when constructed substantially as described, and used for the purposes set forth.

As evidence that I claim the foregoing I have hereunto set my hand.

A. S. BABBIT.

Witnesses:

C. M. ALEXANDER,

J. M. MASON.